United States Patent
Wu

(10) Patent No.: US 7,994,679 B2
(45) Date of Patent: Aug. 9, 2011

(54) SMALL AIR GAP AIR CORE STATOR

(75) Inventor: Di Wu, Round Rock, TX (US)

(73) Assignee: TECO-Westinghouse Motor Company, Round Rock, TX (US)

( * ) Notice: Subject to any disclaimer, the term of this patent is extended or adjusted under 35 U.S.C. 154(b) by 361 days.

(21) Appl. No.: 12/365,607

(22) Filed: Feb. 4, 2009

(65) Prior Publication Data

US 2010/0194232 A1 Aug. 5, 2010

(51) Int. Cl.
*H02K 3/48* (2006.01)
*H02K 1/06* (2006.01)

(52) U.S. Cl. ......... 310/214; 310/216.002; 310/216.001; 310/216.009; 310/216.015

(58) Field of Classification Search ................ 310/214, 310/216.002, 216.001, 216.009, 216.015
See application file for complete search history.

(56) References Cited

U.S. PATENT DOCUMENTS

| | | | |
|---|---|---|---|
| 2,716,724 A * | 8/1955 | Burian | 318/816 |
| 2,734,140 A * | 2/1956 | Parker | 310/268 |
| 4,137,471 A | 1/1979 | Sato et al. | 310/51 |
| 4,228,375 A | 10/1980 | Beermann et al. | 310/214 |
| 4,330,726 A | 5/1982 | Albright et al. | 310/254 |
| 4,352,034 A | 9/1982 | Karhan et al. | 310/59 |
| 4,356,419 A | 10/1982 | Boer et al. | 310/217 |
| 4,454,439 A | 6/1984 | Okamoto et al. | 310/179 |
| 4,475,052 A | 10/1984 | Okamoto et al. | 310/214 |
| 5,053,663 A | 10/1991 | Boer et al. | 310/91 |
| 6,768,244 B2 | 7/2004 | Ong et al. | 310/254 |
| 6,879,081 B1 | 4/2005 | Howard et al. | 310/258 |
| 7,855,485 B2 * | 12/2010 | Wu | 310/216.002 |

FOREIGN PATENT DOCUMENTS

| | | | |
|---|---|---|---|
| DE | 3240728 A1 * | 5/1984 | |
| FR | 2535921 A1 * | 5/1984 | |
| FR | 2537798 A1 * | 6/1984 | |
| WO | WO 02/49190 | 6/2002 | |
| WO | WO 2008/031019 | 3/2008 | |

* cited by examiner

*Primary Examiner* — Quyen Leung
*Assistant Examiner* — Alex W Mok
(74) *Attorney, Agent, or Firm* — Fulbright & Jaworski L.L.P.

(57) ABSTRACT

Stator for use in an electrical machine. A non-magnetic support frame section and a non-magnetic axial coil support are used to provide an air gap stator configuration. The present stators provide an air gap winding configuration that facilitates the fixing of stator coils in the air gap. The stator coils are located near the surface of the magnetic back iron and are separated from adjacent coils by non-magnetic structure.

18 Claims, 3 Drawing Sheets

SMALL AIR GAP AIR CORE STATOR

BACKGROUND

The present devices relate generally to the field of electrical machines, and more particularly to stators for use in electrical machines. The present stators provide an air gap winding configuration that facilitates the fixing of stator coils in the air gap. The stator coils are located near the surface of the magnetic back iron and are separated from adjacent coils by non-magnetic structure.

SUMMARY

Some embodiments of the present stators for use in an electrical machine include a plurality of magnetic back iron sections spaced apart from each other along a longitudinal axis of the stator, a plurality of non-magnetic support frame sections respectively disposed between the magnetic back iron sections, and a plurality of non-magnetic axial coil supports. The non-magnetic support frame section may each have a plurality of support teeth. The non-magnetic axial coil supports may be respectively disposed adjacent to the support teeth such that each non-magnetic axial coil support (1) is not directly fixed to the magnetic back iron sections, and (2) extends past at least one of the support teeth in a direction substantially parallel to the longitudinal axis. The stator may be configured to support stator coils that are respectively disposed within slots defined using the non-magnetic axial coil supports. The slots may be adjacent to the magnetic back iron sections. The slots may contact the magnetic back iron sections.

Some embodiments further comprise a plurality of coil support stiffeners respectively disposed between the support teeth of adjacent non-magnetic support frame sections, and adjacent to the non-magnetic axial coil supports. In some embodiments, the coil support stiffeners are non-magnetic. In some embodiments, each coil support stiffener is directly fixed to at least one of the non-magnetic axial coil supports.

In some embodiments of the present stators, the non-magnetic support frame sections are respectively directly fixed to the magnetic back iron sections. In some embodiments, the non-magnetic axial coil supports are respectively directly fixed to the non-magnetic support frame sections.

Some embodiments of the present stators for use in an electrical machine include a magnetic back iron section, a non-magnetic first support frame section, a non-magnetic second support frame section, and a plurality of non-magnetic axial coil supports. The magnetic back iron section may have a first axial back iron face that is substantially parallel to a first plane that intersects a longitudinal axis of the stator, and a second axial back iron face that is substantially parallel to a second plane that intersects the longitudinal axis.

The non-magnetic first support frame section may be located adjacent to the first axial back iron face, and may have a first support base section and a plurality of first support teeth projecting from the first support base section. The non-magnetic second support frame section may be disposed adjacent to the second axial back iron face, and may have a second support base section and a plurality of second support teeth projecting from the second support base section.

The plurality of non-magnetic axial coil supports may each have a support body and a plurality of support teeth extending from the support body, and may each be respectively disposed adjacent to a first support tooth of the plurality of first support teeth, and to a second support tooth of the plurality of second support teeth, such that each non-magnetic axial coil support is not directly fixed to the magnetic back iron section, and each non-magnetic axial coil support extends past the second support tooth in a direction that is substantially parallel to the longitudinal axis and is away from the first support tooth.

The stator may be configured to support stator coils that are respectively disposed within slots defined using the non-magnetic axial coil supports. The slots may contact the magnetic back iron sections.

Some embodiments further include a plurality of coil support stiffeners respectively disposed between the first support teeth and the second support teeth, and adjacent to the non-magnetic axial coil supports.

In some embodiments, the non-magnetic first support frame section is directly fixed to the first axial back iron face, and the non-magnetic second support frame section is directly fixed to the second axial back iron face. In some embodiments, each non-magnetic axial coil support is directly fixed to the non-magnetic first support frame section and to the non-magnetic second support frame section.

In some embodiments of the present stators, the magnetic back iron section also includes an inner radial back iron face disposed between the first axial back iron face and the second axial back iron face. In some embodiments, the non-magnetic first support frame section may also have a first frame base face that faces the first axial back iron face, and a plurality of first radial support faces that are respectively disposed between the plurality of first support teeth such that the first radial support faces are substantially parallel to the inner radial back iron face. In some embodiments, the non-magnetic second support frame section may also have a second frame base face that faces the second axial back iron face, and a plurality of second radial support faces that are respectively disposed between the plurality of second support teeth such that the second radial support faces are substantially parallel to the inner radial back iron face. In some embodiments, the stator is configured such that the slots are defined using the non-magnetic axial coil supports and the inner radial back iron face.

In some embodiments, the first frame base face may be directly fixed to the first axial back iron face, the non-magnetic first support frame section may not be directly fixed to the inner radial back iron face, the second frame base face may be directly fixed to the second axial back iron face, and the non-magnetic second support frame section may not be directly fixed to the inner radial back iron face.

Any embodiment of any of the present devices may consist of or consist essentially of—rather than comprise/include/contain/have—the described functions, steps and/or features. Thus, in any of the claims, the term "consisting of" or "consisting essentially of" may be substituted for any of the open-ended linking verbs recited above, in order to change the scope of a given claim from what it would otherwise be using the open-ended linking verb.

BRIEF DESCRIPTION OF THE DRAWINGS

The following drawings illustrate by way of example and not limitation. Identical reference numerals do not necessarily indicate an identical structure, system, or display. Rather, the same reference numeral may be used to indicate a similar feature or a feature with similar functionality. Every feature of each embodiment is not always labeled in every figure in which that embodiment appears, in order to keep the figures clear.

FIG. 2 is a perspective view of a part of an embodiment of the present stators, viewed from plane 2-2 of FIG. 1. Portions of two back iron sections and related support frame sections, axial coil supports, and coil support stiffeners are depicted. Some components are omitted for clarity.

FIG. 3 is a perspective view of the embodiment depicted in FIG. 2. Additional components are omitted to facilitate depiction of additional detail.

DESCRIPTION OF ILLUSTRATIVE EMBODIMENTS

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. Thus, a device or system comprising certain elements includes at least the recited elements, but is not limited to only possessing the recited elements.

The terms "substantially," "about," and their variations are defined as being largely but not necessarily wholly what is specified as understood by one of ordinary skill in the art, and in one non-limiting embodiment, the substantially refers to ranges within 10%, preferably within 5%, more preferably within 1%, and most preferably within 0.5% of what is specified.

The terms "a" and "an" are defined as one or more than one, unless this application expressly requires otherwise. The term "another" is defined as at least a second or more.

Figure 1:
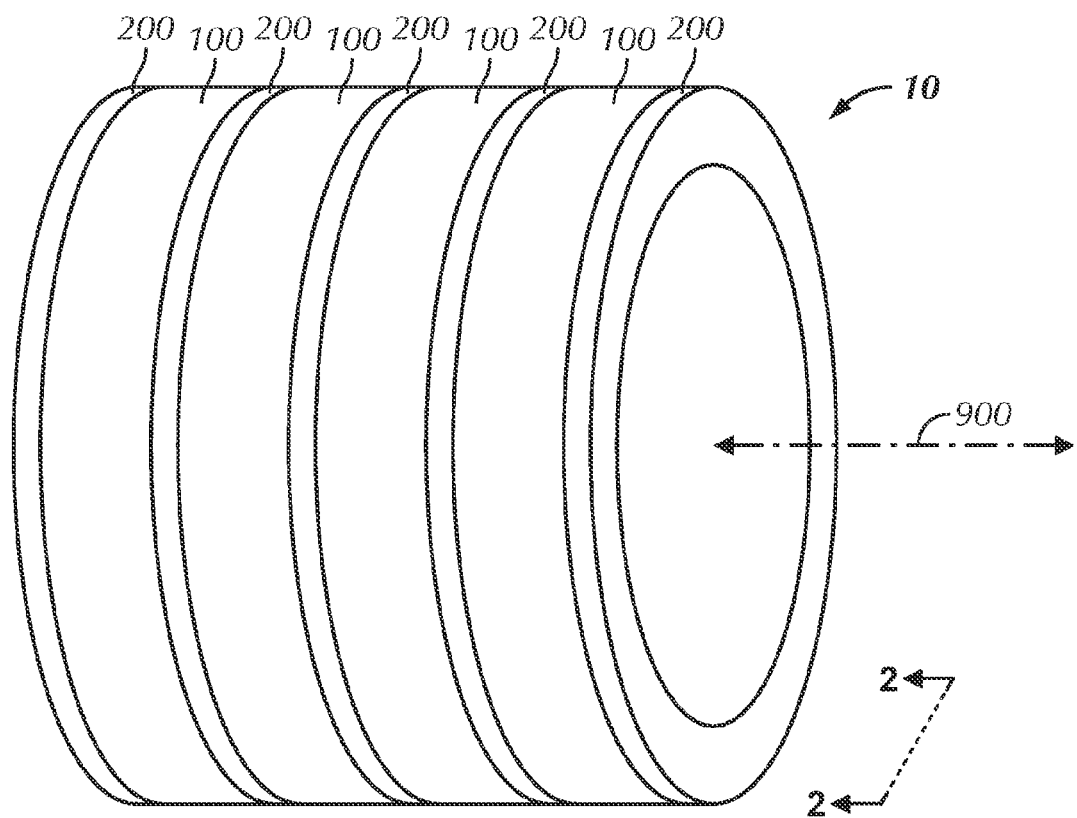
FIG. 1 depicts one embodiment of a present stator for use in an electrical machine.

An example of the present stators for use in electrical machines appears in perspective in FIG. 1. Stator 10 has longitudinal axis 900, and includes a plurality of magnetic back iron section 100 and non-magnetic support frame section 200 disposed along the direction of longitudinal axis 900. In the embodiment depicted, each non-magnetic support frame section 200 may be disposed between two magnetic back iron section 100, or may be disposed adjacent to only one magnetic back iron section 100 (e.g., non-magnetic support frame section 200 may be located at either end of the stator). In some embodiments, non-magnetic support frame section 200 may be disposed between two magnetic back iron section 100, but not be in contact with magnetic back iron section 100 (e.g., there may be other components between magnetic back iron section 100 and the nearest non-magnetic support frame section 200).

Figure 2:
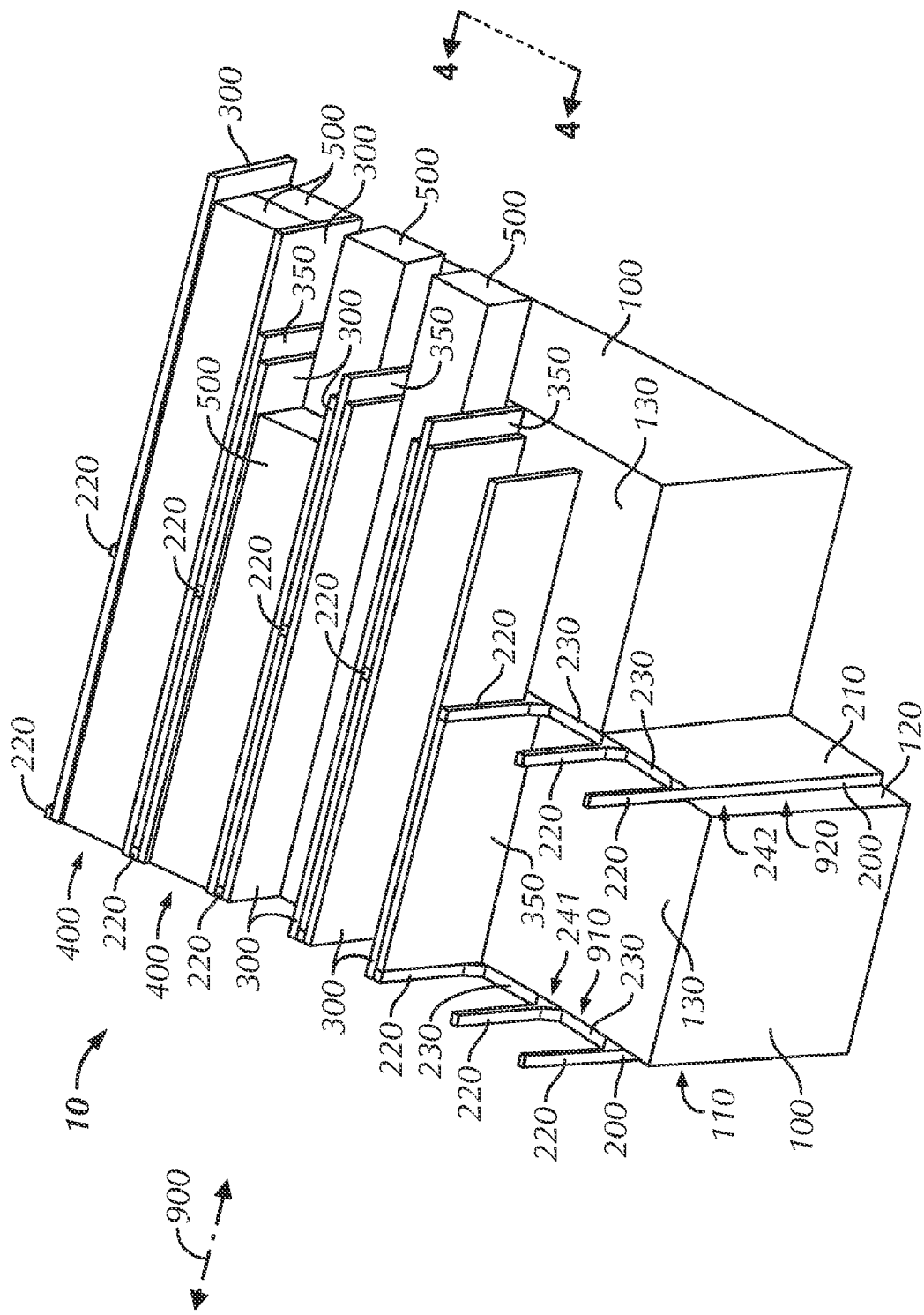
FIGS. 2 and 3 are drawn to scale, meaning the sizes of the depicted elements are accurate relative to each other.

In some embodiments, magnetic back iron section 100 and non-magnetic support frame section 200 may be directly fixed to each other. Two objects may be "directly fixed" to each other by directly joining one or more surfaces of one object to one or more surfaces of the second object by means such as adhesive bonding, welding, soldering, or joining using surface features (e.g., interference fits, dovetail joints). Two objects may also be "directly fixed" to each other using fasteners that interface with the two objects to directly constrain the two objects relative to each other (e.g., threaded fasteners, rivets, guiding pins). Two objects may be in contact and fixed relative to each other without being "directly fixed." For example, as depicted in FIG. 2, magnetic back iron section 100 may be directly fixed to non-magnetic support frame section 200 by virtue of, for example, magnetic back iron section 100 being welded to non-magnetic support frame section 200. Non-magnetic support frame section 200 may be directly fixed to non-magnetic axial coil support 300 by virtue of, for example, non-magnetic support frame section 200 being adhesively or mechanically bonded to non-magnetic axial coil support 300. As a result, magnetic back iron section 100 and non-magnetic axial coil support 300 may be in contact, and may be fixed relative to each other. However, magnetic back iron section 100 and non-magnetic axial coil support 300 are not "directly fixed" to each other because there is no direct joining between surfaces of magnetic back iron section 100 and non-magnetic axial coil support 300, and there are no fasteners that interface with magnetic back iron section 100 and non-magnetic axial coil support 300 to constrain them relative to each other.

In some embodiments, magnetic back iron section 100 may be fixed to non-magnetic support frame section 200 by virtue of, for example, magnetic back iron section 100 and/or magnetic support frame section 200 being welded to core bars, or being installed using axially-aligned guiding pins.

Figure 3:
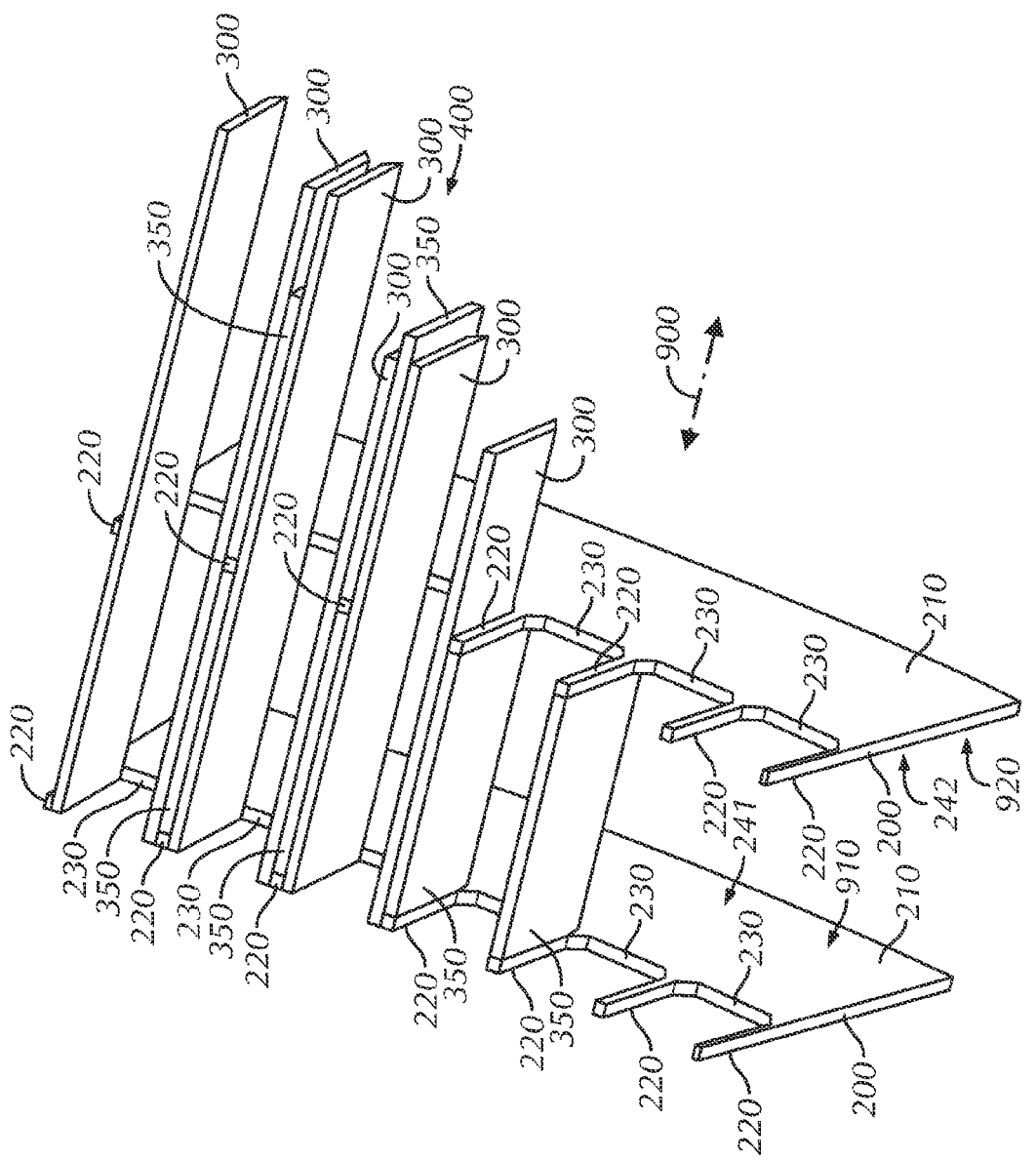

Referring to FIGS. 2-3, magnetic back iron section 100 may have first axial back iron face 110, second axial back iron face 120, and inner radial back iron face 130. First axial back iron face 110 may be substantially parallel to first plane 910, and second axial back iron face 120 may be substantially parallel to second plane 920, where first plane 910 and second plane 920 each intersect longitudinal axis 900. Magnetic back iron section 100 may contain any suitable magnetic material, such as, for example, silicon steel, and may be configured to reduce AC losses (e.g., low conductivity, lamination construction in some embodiments). Stator 10 may comprise multiple magnetic back iron section 100 spaced apart from each other along the direction of longitudinal axis 900, with one or more non-magnetic support frame section 200 located between the multiple magnetic back iron section 100.

Non-magnetic support frame section 200 may include frame body 210 that has a frame base face (241 and/or 242). The frame base face may be substantially parallel to first plane 910 and/or second plane 920, and may face first axial back iron face 110 or second axial back iron face 120. In some embodiments, non-magnetic support frame section 200 may be directly fixed to magnetic back iron section 100, for example by directly joining first frame base face 241 and first axial back iron face 110, or by directly joining second frame base face 242 and second axial back iron face 120. In other embodiments, non-magnetic support frame section 200 and magnetic back iron section 100 may not be directly fixed to each other.

Non-magnetic support frame section 200 may also include radial support face 230 that is substantially parallel to inner radial back iron face 130. Some embodiments may also include a plurality of frame tooth 220 that extend from frame body 210. Non-magnetic support frame section 200 may contain any suitable non-magnetic material, such as, for example, stainless steel, phenolic materials, or suitable low-conductivity alloys. Still referring to FIGS. 2-3, stator 10 may include non-magnetic axial coil support 300 that is located adjacent to support tooth 220 of non-magnetic support frame section 200. Non-magnetic axial coil support 300 may be adjacent to and in contact with magnetic back iron section 100, but in some embodiments may not be directly fixed to magnetic back iron section 100. Non-magnetic axial coil support 300 may extend past support tooth 220 in a direction parallel to longitudinal axis 900. Non-magnetic axial coil support 300 and inner radial back iron face 130 may be used to define slot 400, which is configured for supporting a stator coil. Additional supporting structure may be required in addition to non-magnetic axial coil support 300 and inner radial back iron face 130 to fully constrain the stator coil. Non-magnetic axial coil support 300 may contain any suitable non-magnetic material, such as, for example, stainless steel, phenolic materials, or suitable low-conductivity alloys. In some embodiments, non-magnetic axial coil support 300 may be directly fixed to non-magnetic support frame section 200. In other embodiments, non-magnetic support frame section 200 and non-magnetic axial coil support 300 may not be directly fixed to each other.

Stator 10 may also include coil support stiffener 350 located between support tooth 220 of adjacent non-magnetic support frame section 200. Coil support stiffener 350 may be directly fixed to non-magnetic support frame section 200 by, for example, adhesive bonding or welding. In some embodiments coil support stiffener 350 may be directly fixed to non-magnetic axial coil support 300 by, for example, adhesive bonding, welding, joining using surface features, or pins. In some embodiments, coil support stiffener 350 may not be directly fixed to non-magnetic support frame section 200, and/or coil support stiffener 350 may not be directly fixed to non-magnetic axial coil support 300. Coil support stiffener 350 may contain any suitable non-magnetic material, such as, for example, stainless steel, phenolic materials, mica, or suitable low-conductivity alloys.

Figure 4:
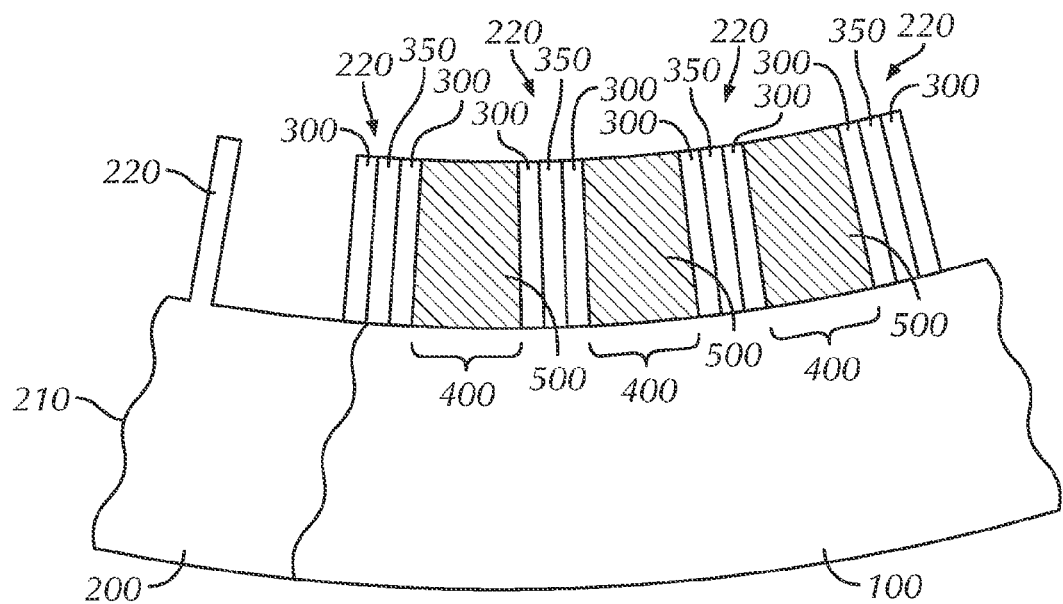
FIG. 4 is a axial view of the embodiments depicted in FIG. 3, viewed from plane 4-4. Stator coils, slots, back iron sections, support frame sections, axial coil supports, and coil support stiffeners are depicted.

FIG. 4 depicts a detailed view of an embodiment of stator 10, viewed from the axial direction. Stator coil 500 are depicted within slot 400 that are each defined using non-magnetic axial coil support 300 and inner radial back iron face 130. This configuration provides an air gap winding configuration where the height of the air gap is minimized (e.g., stator coil 500 may be located at or near the surface of magnetic back iron section 100, but the material separating adjacent instances of stator coil 500 are non-magnetic). Additional supporting structure may be employed to fully secure stator coil 500 within slot 400 (e.g., a radial cover or wedge, not shown).

Descriptions of well known assembly techniques, components, and equipment have been omitted so as not to unnecessarily obscure the present devices in unnecessary detail. The descriptions of the present devices are exemplary and non-limiting. Certain substitutions, modifications, additions and/or rearrangements falling within the scope of the claims, but not explicitly listed in this disclosure, may become apparent to those of ordinary skill in the art based on this disclosure. For example, additional supporting structure may be employed to fully secure stator coil 500 within slot 400. Furthermore, in some embodiments coil support stiffener 350 may not be present, and/or non-magnetic axial coil support 300 may not be planar on all sides.

The appended claims are not to be interpreted as including means-plus-function limitations, unless such a limitation is explicitly recited in a given claim using the phrase(s) "means for" and/or "step for," respectively.

What is claimed is:

1. An stator for use in an electrical machine, the stator comprising:
   a plurality of magnetic back iron sections spaced apart from each other along a longitudinal axis of the stator;
   a plurality of non-magnetic support frame sections respectively disposed between the magnetic back iron sections, each non-magnetic support frame section having a plurality of support teeth; and
   a plurality of non-magnetic axial coil supports respectively disposed adjacent to the support teeth such that each non-magnetic axial coil support (1) is not directly fixed to the magnetic back iron sections, and (2) extends past at least one of the support teeth in a direction substantially parallel to the longitudinal axis;
   where the stator is configured to support stator coils that are respectively disposed within slots that are defined using the non-magnetic axial coil supports.

2. The stator of claim 1, further comprising a plurality of coil support stiffeners respectively disposed between the support teeth of adjacent non-magnetic support frame sections, and adjacent to the non-magnetic axial coil supports.

3. The stator of claim 2, where the coil support stiffeners are non-magnetic.

4. The stator of claim 2, where each coil support stiffener is directly fixed to at least one of the non-magnetic axial coil supports.

5. The stator of claim 1, where the non-magnetic support frame sections are respectively directly fixed to the magnetic back iron sections.

6. The stator of claim 1, where the non-magnetic axial coil supports are respectively directly fixed to the non-magnetic support frame sections.

7. A stator for use in an electrical machine, the stator comprising
   a magnetic back iron section having:
      a first axial back iron face that is substantially parallel to a first plane that intersects a longitudinal axis of the stator; and
      a second axial back iron face that is substantially parallel to a second plane that intersects the longitudinal axis;
   a non-magnetic first support frame section disposed adjacent to the first axial back iron face, the non-magnetic first support frame section having:
      a first support base section; and
      a plurality of first support teeth projecting from the first support base section;
   a non-magnetic second support frame section disposed adjacent to the second axial back iron face, the non-magnetic second support frame section having:
      a second support base section; and
      a plurality of second support teeth projecting from the second support base section; and
   a plurality of non-magnetic axial coil supports, each respectively disposed adjacent to a first support tooth of the plurality of first support teeth, and to a second support tooth of the plurality of second support teeth, such that:
      each non-magnetic axial coil support is not directly fixed to the magnetic back iron section; and
      each non-magnetic axial coil support extends past the second support tooth in a direction that is substantially parallel to the longitudinal axis and is away from the first support tooth;
   where the stator is configured to support stator coils that are respectively disposed within slots defined using the non-magnetic axial coil supports.

8. The stator of claim 7, further comprising a plurality of coil support stiffeners respectively disposed between the first support teeth and the second support teeth, and adjacent to the non-magnetic axial coil supports.

9. The stator of claim 8, where the coil support stiffeners are non-magnetic.

10. The stator of claim 8, where each coil support stiffener is directly fixed to at least one of the non-magnetic axial coil supports.

11. The stator of claim 7, where the non-magnetic first support frame section is directly fixed to the first axial back iron face, and the non-magnetic second support frame section is directly fixed to the second axial back iron face.

12. The stator of claim 7, where each non-magnetic axial coil support is directly fixed to the non-magnetic first support frame section and to the non-magnetic second support frame section.

13. An stator for use in an electrical machine, the stator comprising:
a magnetic back iron section having:
a first axial back iron face that is substantially parallel to a first plane that intersects a longitudinal axis of the stator;
second axial back iron face that is substantially parallel to a second plane that intersects the longitudinal axis; and
an inner radial back iron face disposed between the first axial back iron face and the second axial back iron face;
a non-magnetic first support frame section disposed adjacent to the first axial back iron face, the non-magnetic first support frame section including:
a first support base section having a first frame base face that faces the first axial back iron face;
a plurality of first support teeth projecting from the first support base section; and
a plurality of first radial support faces that are respectively disposed between the plurality of first support teeth such that the first radial support faces are substantially parallel to the inner radial back iron face;
a non-magnetic second support frame section disposed adjacent to the second axial back iron face, the non-magnetic second support frame section including:
a second support base section having a second frame base face that faces the second axial back iron face;
a plurality of second support teeth projecting from the second support base section; and
a plurality of second radial support faces that are respectively disposed between the plurality of second support teeth such that the second radial support faces are substantially parallel to the inner radial back iron face; and
a plurality of non-magnetic axial coil supports, each respectively disposed adjacent to a first support tooth of the plurality of first support teeth, and to a second support tooth of the plurality of second support teeth, such that:
each non-magnetic axial coil support is not directly fixed to the magnetic back iron section; and
each non-magnetic axial coil support extends past the second support tooth in a direction that is substantially parallel to the longitudinal axis and is away from the first support tooth;
where the stator is configured to support stator coils that are respectively disposed within slots defined using the non-magnetic axial coil supports and the inner radial back iron face.

14. The stator of claim 13, further comprising a plurality of coil support stiffeners, each respectively disposed between the first support teeth and the second support teeth, and adjacent to the non-magnetic axial coil supports.

15. The stator of claim 14, where the coil support stiffeners are non-magnetic.

16. The stator of claim 14, where the coil support stiffeners are respectively directly fixed to at least one of the non-magnetic axial coil supports.

17. The stator of claim 13, where:
the first frame base face is directly fixed to the first axial back iron face;
the non-magnetic first support frame section is not directly fixed to the inner radial back iron face;
the second frame base face is directly fixed to the second axial back iron face; and
the non-magnetic second support frame section is not directly fixed to the inner radial back iron face.

18. The stator of claim 13i where the non-magnetic axial coil supports are respectively directly fixed to the non-magnetic first support frame section and to the non-magnetic second support frame section.

* * * * *